United States Patent
Ho

(10) Patent No.: US 7,270,424 B2
(45) Date of Patent: Sep. 18, 2007

(54) COLOR SEPARATION PRISM ASSEMBLY

(75) Inventor: Fang-Chuan Ho, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 363 days.

(21) Appl. No.: 11/095,574

(22) Filed: Apr. 1, 2005

(65) Prior Publication Data

US 2006/0001837 A1    Jan. 5, 2006

(30) Foreign Application Priority Data

Jun. 30, 2004    (TW) ............................... 93119416 A

(51) Int. Cl.
G02B 27/14    (2006.01)

(52) U.S. Cl. ..................... 353/81; 353/33; 359/638; 359/634

(58) Field of Classification Search ............ 353/20, 353/33, 81; 359/629, 634, 638, 834; 349/9
See application file for complete search history.

(56) References Cited

U.S. PATENT DOCUMENTS

| | | | | | |
|---|---|---|---|---|---|
| 4,478,494 | A | * | 10/1984 | Soref | .......................... 359/320 |
| 5,717,472 | A | * | 2/1998 | Lee | ................................. 349/9 |
| 6,490,087 | B1 | * | 12/2002 | Fulkerson et al. | ........... 359/487 |
| 6,715,882 | B2 | * | 4/2004 | Ishii | ............................ 353/31 |
| 6,885,403 | B2 | * | 4/2005 | Ho et al. | ..................... 348/336 |
| 2006/0044525 | A1 | * | 3/2006 | Lee et al. | ...................... 353/81 |

* cited by examiner

Primary Examiner—William C. Dowling
(74) Attorney, Agent, or Firm—Birch, Stewart, Kolasch & Birch, LLP

(57) ABSTRACT

A color separation prism assembly. The color separation prism assembly includes a polarizing beam splitter and a plurality of prism blocks. The polarizing beam splitter is coated with a polarizing beam splitter coating on a diagonal plane thereof. A first filter and a second filter, each corresponding to a specific color band, are respectively formed on two adjacent bounding surfaces of the polarizing beam splitter. A first prism block and a second prism block are connected to the polarizing beam splitter through the first filter and the second filter, respectively. The second prism block is a rectangular prism with a third filter formed on a base surface thereof. A third prism block is connected to the rectangular prism through the third filter. An angle formed by an inclined side of the rectangular prism and the base surface of the third filter is no more than 30°.

22 Claims, 8 Drawing Sheets

COLOR SEPARATION PRISM ASSEMBLY

BACKGROUND

The invention relates to a prism assembly, and in particular to a color separation prism assembly for a projector.

FIG. 1 is a schematic view of an optical system disclosed in U.S. Pat. No. 5,621,486, with a Philips prism assembly 100 separating incident light into colors, such as red (R), blue (B), and green (G). As shown in FIG. 1, the Philips prism assembly 100 comprises three prisms 102, 104, and 106, and two color separating surfaces 108 and 110 with dichroic coatings. Air gap 114 is formed between the prisms 102 and 104. When incident light I enters the prism assembly 100, the color separating surface 110 reflects red light $I_R$ and allows blue light $I_B$ and green light $I_G$ to penetrate through. The reflected red light $I_R$ is further reflected by an inner surface of the prism 102 to enter the liquid crystal light valve (LCLV) 112R. After incident light I with filtered red light $I_R$ passes through the air gap 114, it impinges upon the color separating surface 108, filtering the reflected blue light $I_B$ and permitting penetration of the green light $I_G$. Thus, the green light $I_G$ directly penetrates the color separating surface 108 and enters the LCLV 112G. After the blue light $I_B$ is reflected by the color separating surface 108, total reflection occurs at the interface between the air gap 114 and the prism 104 such that the blue light $I_B$ is reflected and enters the LCLV 112B.

The disclosed method reduces volume of the prism assembly, and the light beam can impinge upon the color separating surface at a smaller incident angle; however, before separating the blue light $I_B$ and the green light $I_G$, the light must penetrate through the air gap 114 in an inclined direction. The light paths at different angles will reduce image accuracy. Furthermore, the back focal length is longer.

FIG. 2 is a schematic view of a cross dichroic prism of a color projector 200 separating incident light into red, blue, and green colors, as disclosed in U.S. Pat. No. 5,153,752. As shown in FIG. 2, an S polarized component and a P polarized component of the incident light I of the color projector 200 are reflected by polarized beam splitters 202a and 202b, respectively, and enter the cross dichroic prism 204. The cross dichroic prism 204 is constructed by a plurality of cross dichroic mirrors 204a, 204b, 204c, and 204d, as shown by diagonal lines of a quadrangular cross section. The dichroic mirrors 204a and 204d have characteristics to filter and reflect only the blue light component. The dichroic mirrors 204b and 204c have characteristics to filter and reflect only the red light component such that the red light (RS), green light (GS), and blue light (BS) are directed to corresponding liquid crystal light valves 208R, 208G, and 208B, respectively. The liquid crystal light valves can modulate and reflect individual color light components, such that the color light components are reflected and combined to enter the projection lens system 206.

Although the color projector 200 shortens the back focal length to avoid the disadvantages of the previously mentioned prism assembly 100, the designed light beam impinges on the color separating surfaces at an extremely large incident angle of 45°. If the incident angle at the color separating surfaces is too large, the polarizing light spectrum through the dichroic mirrors is sensitively shifted with variation of incident angle, reducing color purity after color separation. The overall color light separation efficiency of the prism assembly is reduced, accordingly. Furthermore, during manufacture of the cross dichroic prism 204, it is difficult to manufacture the dichroic mirrors in alternative arrangements.

SUMMARY

Embodiments of the invention provide a color separation prism assembly to eliminate the shortcomings described.

Also provided is a color separation prism assembly comprising a polarizing beam splitter and a plurality of prism blocks. A polarizing beam splitter coating is coated on a diagonal plane of the polarizing beam splitter. A first filter and a second filter, each corresponding to a specific color band, are formed on two adjacent bounding surfaces, respectively. A first prism block and a second prism block are disposed on a first dichroic filter and a second dichroic filter to connect to the polarizing beam splitter. The second prism block is a rectangular prism with a third filter formed on a base surface thereof. A third prism block is connected to the rectangular prism through the third filter. An angle formed by an inclined side of the rectangular prism and the base surface of the third filter is no more than 30°.

Due to the combination of the polarizing beam splitter and non-polarizing dichroic filters with high separation ratios, the incident light can impinge on the polarizing beam splitter coating at a large incident angle of 45° while having a light splitting result with improved P- and S-polarization. In addition, an angle formed by an inclined side of the rectangular prism of the second prism block and the base surface of the third filter is no more than 30°. Thus, the invention limits the incident angle inclined at the dichroic filter within 30° to achieve improved color control. Moreover, a simple and easy prism block arrangement shortens light path of each color component by providing a shorter back focal length. The simple combination of prism blocks reduces manufacturing costs and increase optical alignment tolerance. Since the prism group does not have an air gap, problems due to light passing through the air gap in an inclined direction are eliminated. Thus, the image accuracy is increased, and image color is enhanced.

BRIEF DESCRIPTION OF THE DRAWINGS

Embodiments of the invention can be more fully understood by reading the subsequent detailed description in conjunction with the examples and references made to the accompanying drawings, wherein.

DETAILED DESCRIPTION

Figure 1:
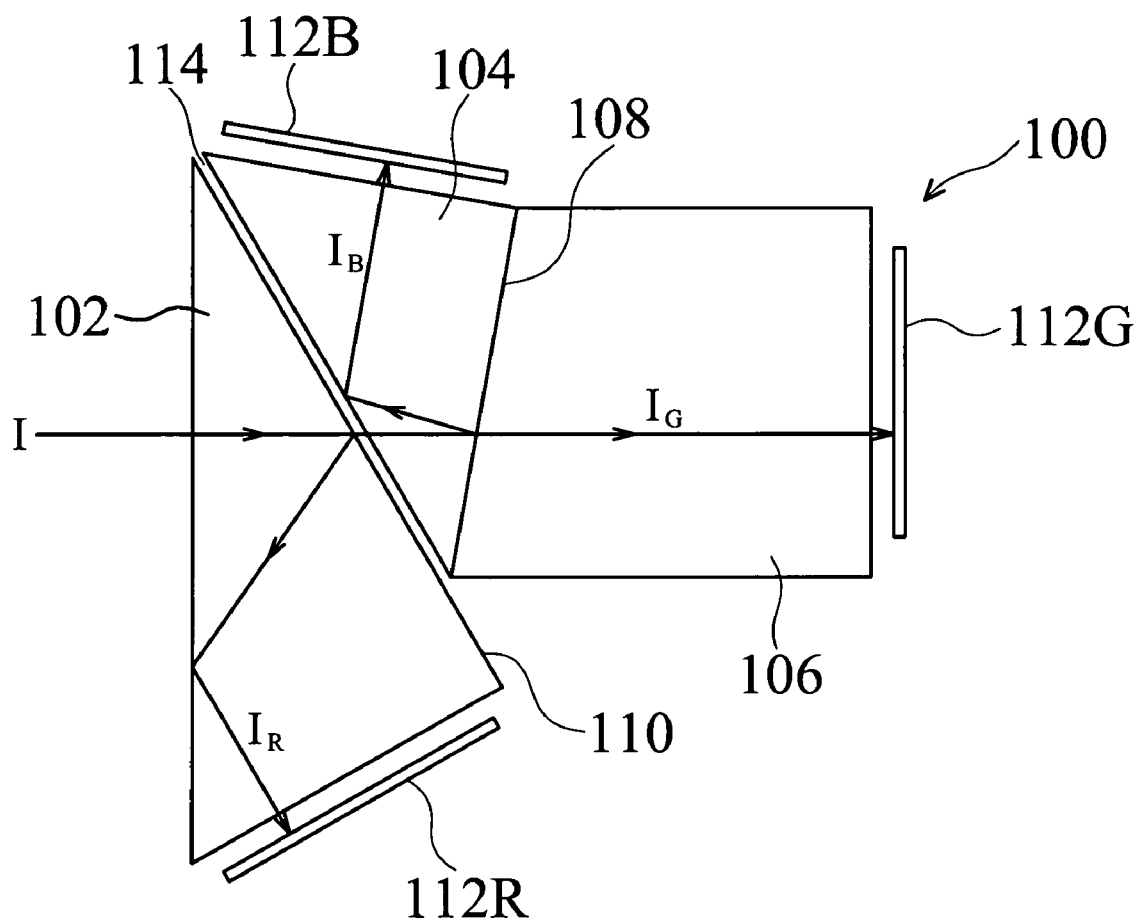
FIG. 1 is a schematic view of a conventional optical system with Phillips prism assembly for separating an incident light into red, blue, and green color components.
Figure 2:
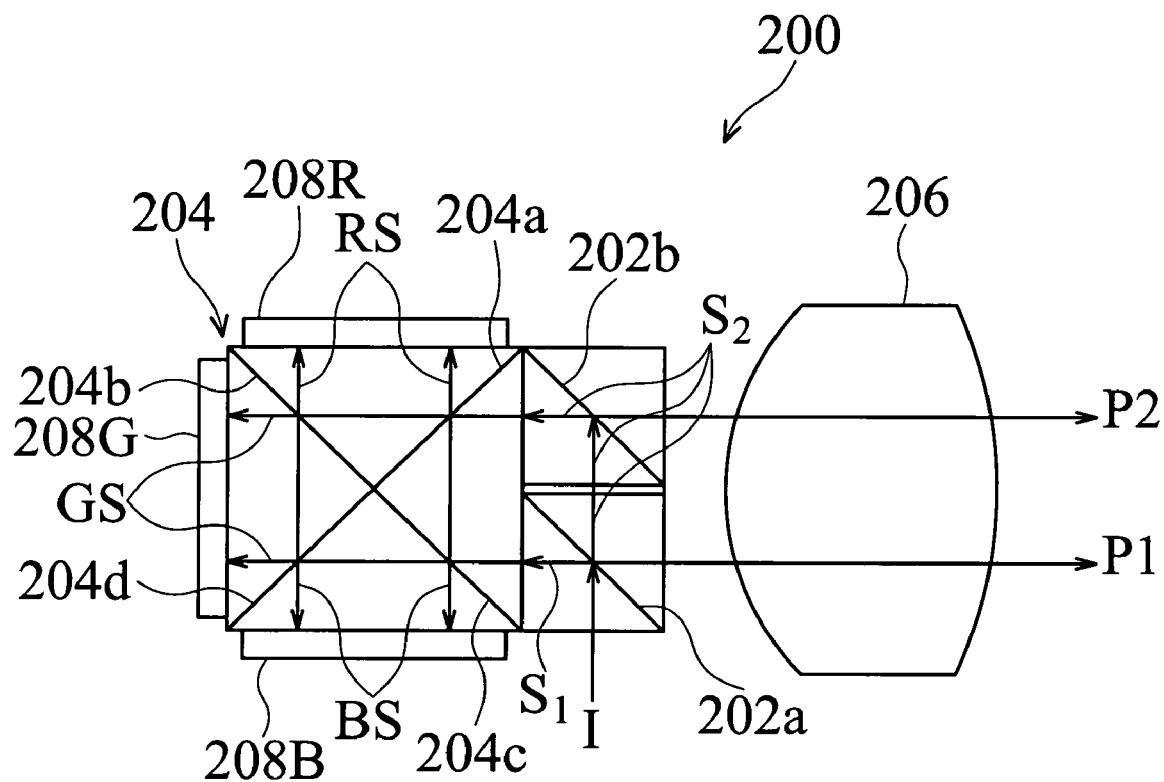
FIG. 2 is a schematic view of another conventional optical system with a cross dichroic assembly of a color projector for separating an incident light into red, blue, and green color components.
Figure 3:
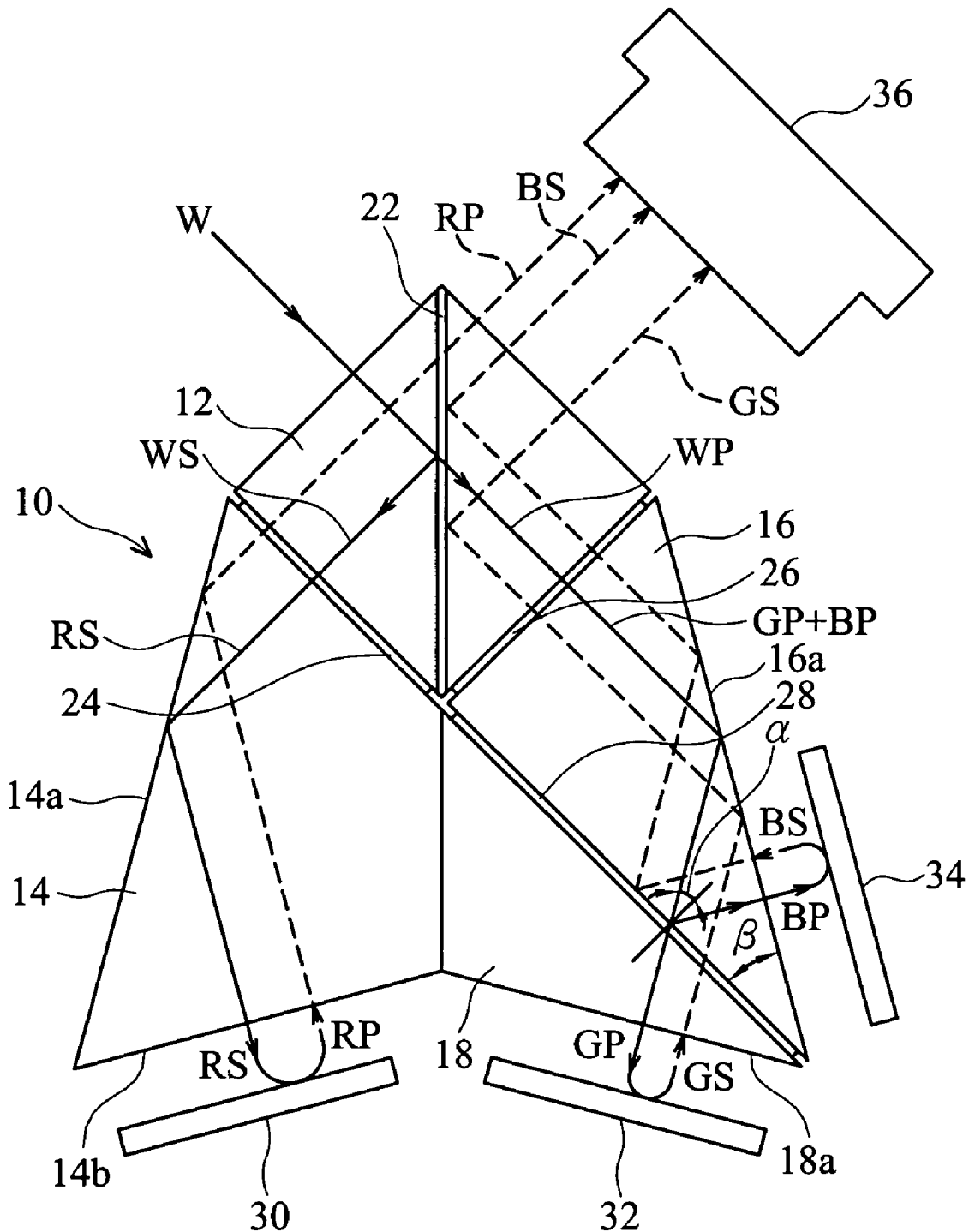
FIG. 3 is a schematic plan view of a color separation prism assembly of an embodiment of the invention.

FIG. 3 is a schematic plan view of a color separation prism assembly of an embodiment of the invention. The color separation prism assembly 10 separates incident white light into red (R), green (G), and blue (B) color components, each entering a corresponding light valve, for example, liquid crystal light valves (LCLV) 30, 32, and 34. In FIG. 3, solid lines represent incident light W, separated into three different color components through the color separation prism assembly 10, the light paths entering the liquid crystal light valves. Dotted lines represent the light paths from different color components reflected by the liquid crystal light valves toward a projector lens 36 via the color separation prism assembly 10.

As shown in FIG. 3, the color separation prism assembly 10 comprises a polarizing beam splitter (PBS) 12, prism blocks 14, 16, and 18. The polarizing beam splitter 12 is constructed of a cube. The prism block 14 is a quadrangular prism. The prism block 16 is a rectangular prism, and the prism block 18 is a triangular prism.

Figure 4A:
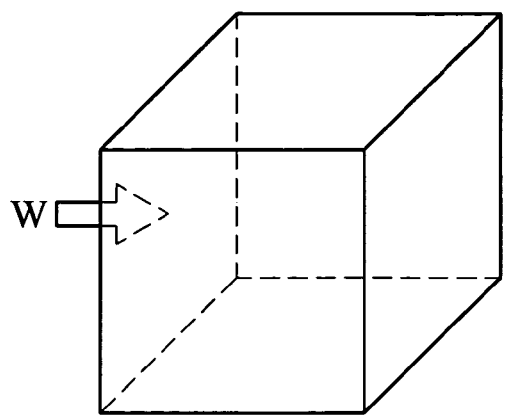
FIGS. 4A to 4D are schematic views of different prism elements of embodiments of the invention.
Figure 4B:
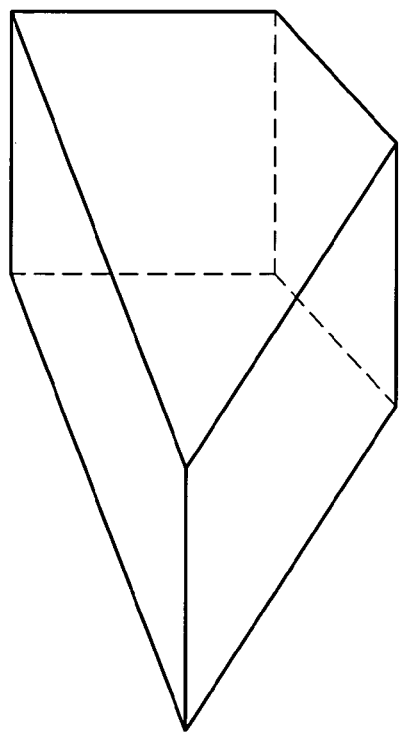
Figure 4C:
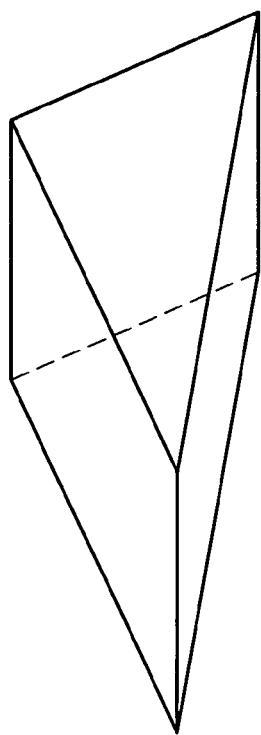
Figure 4D:
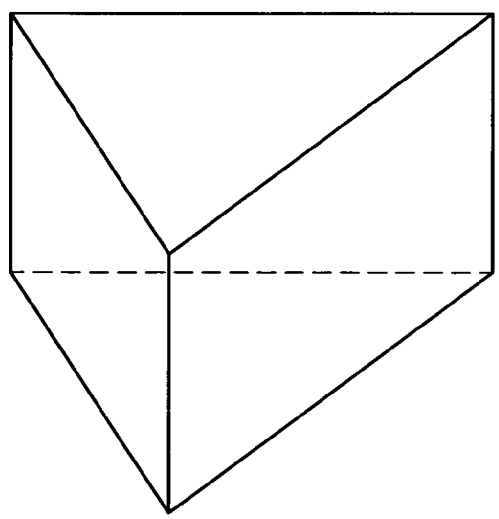

In FIGS. 4A, 4B, 4C, and 4D, the cube, the quadrangular prism, the rectangular prism, and the triangular prism are clearly shown, respectively, as different prism elements used in the color separation prism assembly 10. In FIG. 4D, the triangular prism is constructed of a pair of parallel horizontal planes and three vertical planes perpendicular to the horizontal planes. Similarly, in FIG. 4B, the quadrangular prism comprises a pair of parallel horizontal planes and four planes perpendicular to the horizontal planes. Moreover, incident light W enters the vertical side of the cube in FIG. 4A and then the color separation prism assembly 10. In addition, the vertical planes of each prism element are referred to as "bounding surfaces" in accordance with the plane view of FIG. 3.

Referring to FIG. 3 again, a PBS coating 22 with a high separation ratio (T/R) is coated on a diagonal plane of the cube of the polarizing beam splitter 12. The formation of the PBS coating 22 on the diagonal plane is not limited in the invention. For example, the PBS coating 22 can be formed by a layer of interfering film or two parallel interfering films on the diagonal plane of the cube. An intermediate material with a refraction index close to that of the prism is filled between the parallel interfering films to connect the two films such that the PBS coating 22 has a higher separation ratio.

In addition, the polarizing beam splitter 12 is connected to bounding surfaces of the prism blocks 14 and 16, coated with interfering films for filtering specific color bands to form dichroic filters 24 and 26. In this embodiment, the dichroic filter 24 filters and reflects green and blue color components, allowing penetration of red color components. The other dichroic filter 26 filters and reflects red color components while allow penetration of green and blue color components. The dichroic filters 24 and 26 are formed on each bounding surface of the prism blocks 14 and 16, respectively. The prism blocks 14 and 16 are fixed on the polarizing beam splitter 12 by cementation.

A dichroic filter 28 is formed on a bounding surface of the prism block 16. The dichroic filter 28 is formed on the same plane as the dichroic filter 24 to filter and reflect the blue component, permitting green component to pass therethrough. The bounding surface of the prism block 18 is surrounded by the dichroic filter 28 and a bounding surface of the prism block 14. The prism block 18 is fixed between the prism blocks 14 and 16 by cementation with a surface of the prism block 18 contacting one surface of the prism block 14 and another surface contacting one surface of the prism block 16. The prism block 18 is located on the same diagonal plane as the PBS coating 22 formed between a connecting surface of the prism block 14 and the polarizing beam splitter 12. The prism blocks 14, 16, and 18, facing the bounding surface of the liquid crystal light valves 30, 32, and 34, are maintained parallel to the planes of the liquid crystal light valves 30, 32, and 34.

The paths of incident light W separated into three different color components via the color separation prism assembly 10 with each color component projecting to a corresponding liquid crystal light valve are described in the following, as shown in FIG. 3.

As shown by the solid line, incident light W initially enters from a bounding surface without PBS coating of the polarizing beam splitter 12 to enter the color separation prism assembly 10 of the invention, and incident light W impinges on the PBS coating 22 at an incident angle of 45°. Afterward the S-polarized light WS is reflected by the PBS coating 22 and enters the dichroic filter 24, perpendicular thereto. The P-polarized light WP penetrates the PBS coating 22 to enter the dichroic filter 26 perpendicular thereto. Next, the dichroic filter 24 filters out the green and blue components GS and BS from the S-polarized light, and reflects the green and blue components GS and BS toward the light source. The red component RS can penetrate the dichroic filter 24, entering the prism block 14. An inclined angle of the bounding surface 14a of the prism block 14 is designed such that the surface 14a produces total reflection for the red component RS with respect to the S-polarized light. Thus, after the red component RS is totally reflected via the bounding surface 14a of the prism block 14, the red component RS leaves from another surface 14b of the prism block 14, entering the liquid crystal light valve 30.

In addition, the red component RP of the P-polarized light WP entering the dichroic filter 26 is filtered and reflected toward the light source. The green and blue components GP and BP penetrate the dichroic filter 26, entering the prism block 16.

In the embodiment, the prism block 16 comprises a rectangular prism with an inclined side 16a, forming an angle β of 30° with the bounding surface of the dichroic filter 28. Thus, after the green and the blue components GP and BP enter the prism block 16, total reflection occurs at the inclined side 16a, and the green and the blue components GP and BP impinge on the dichroic filter 28 at an incident angle α less than 30°. The blue component BP is filtered and reflected by the dichroic filter 28, and the green component GP passes through the dichroic filter 28. Thus, after passing through, the green component GP leaves from a bounding surface 18a of the prism block 18 in a perpendicular direction, entering the liquid crystal light valve 32. The blue component of the P-polarized light directly leaves from the inclined side 16a of the rectangular prism at a right angle to enter the liquid crystal light valve 34.

The principle of the liquid crystal light valve is a light valve formed in liquid crystal between substrates. The electrical switch actuates rotation of the liquid crystal molecule to generate addressed pixel sites, determining brightness of the image pixels. The light at the addressed pixel sites is reflected upward and polarization thereof is varied.

As shown by the dashed lines in FIG. 3, the red component RS of the S-polarized light is reflected by the addressed pixel sites on the liquid crystal light valve 30 and changed to a P-polarized light. The red component of the P-polarized light is sequentially reflected by the total reflection surface 14a, penetrating the dichroic filter 24, penetrating the PBS coating 22, and entering the projective lens 36. The green and blue components GP and BP are reflected by the addressed pixel sites on the liquid crystal light valves 32 and 34, respectively, and changed to S-polarization. The green component GS of the S-polarized light sequentially passes the dichroic filter 28, is reflected by the total reflection surface 16a, penetrating the dichroic filter 26, reflected by the PBS coating 22, and enters the projective lens 36. The blue component BS of the S-polarized light is sequentially reflected by the dichroic filter 28, reflected by the total reflection surface 16a, penetrates the dichroic filter 26, reflected by the PBS coating 22, and enters the projective lens 36. Thus, the color separation prism assembly 10 of the invention reflects light from each addressed pixel site to the projective lens 36 to generate a color image. Moreover, the incident light at the non-addressed pixel sites on each liquid crystal light valve is reflected without changing polarization so that the light returns to the light source along the original path thereof.

In general, the color separation effect of the interfering film is easily affected by incident angle of the light. When the incident angle is too large, the polarized light spectrum passing through the dichroic filter is shifted, reducing color purity after separation. Thus, the incident light at the dichroic filter must be less than or equal to 30°.

Due to the combination of the polarizing beam splitter and non-polarizing dichroic filters with high separation ratios, the incident light impinges on the polarizing beam splitter coating at a large incident angle of 45° with improved P- and S-polarization color separation. In addition, an angle β formed by an inclined side 16a of the rectangular prism and the bounding surface of the dichroic filter 28 is 30°. Thus, the invention limits the incident angle α inclined at the dichroic filter within 30° to achieve an improved color control.

Moreover, it is assumed that the light beam can travel through each permeable surface of the prism group at a perpendicular angle. The invention provides a simple and easy prism block arrangement that shortens the light path of each color component by providing a shorter back focal length. The simple combination of prism blocks reduces manufacturing costs and increases optical alignment tolerance. Since the prism group does not have an air gap, problems due to the light passing through the air gap in an inclined direction are eliminated. Thus, image accuracy is increased, and image color enhanced.

Figure 5:
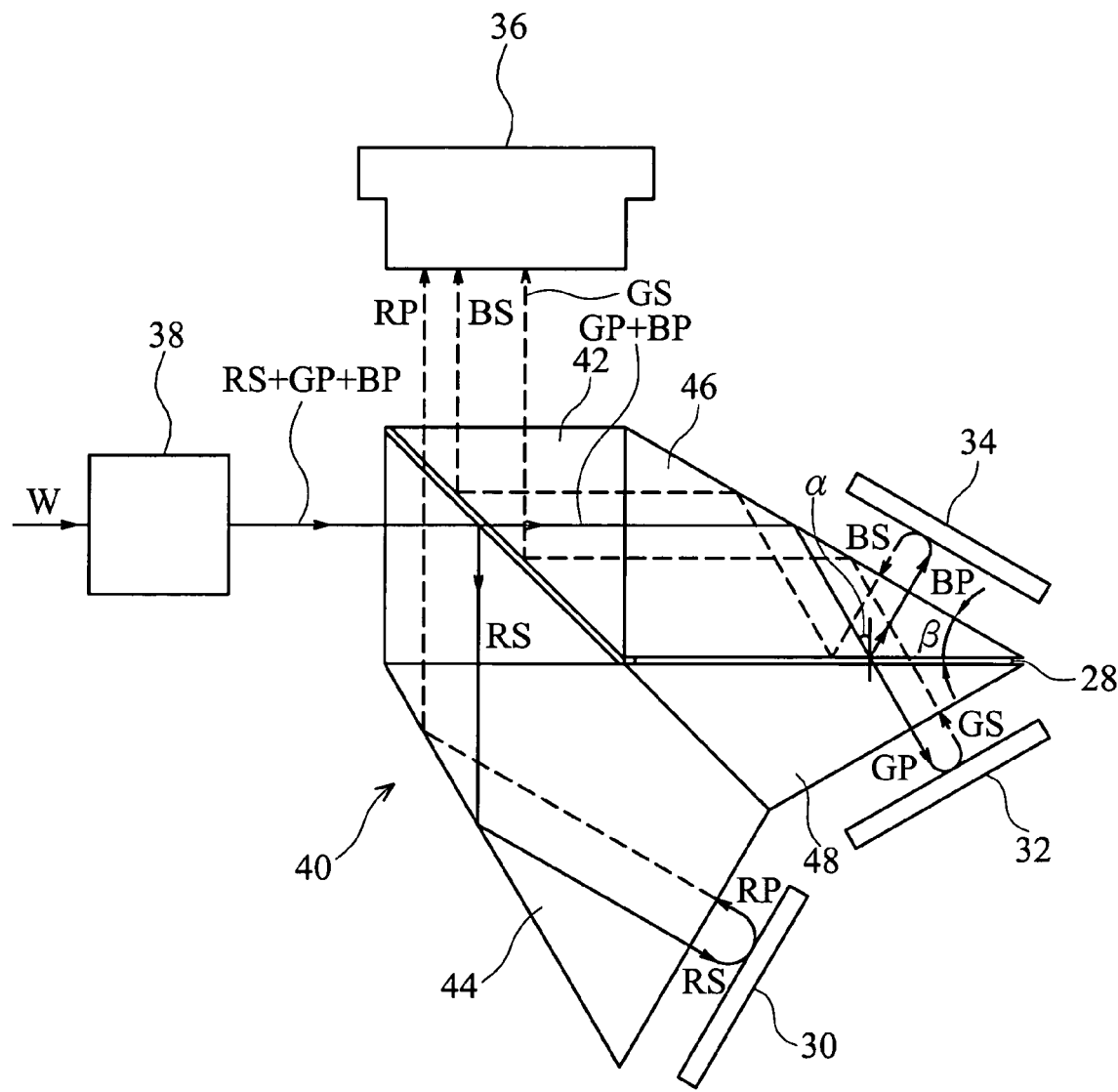
FIG. 5 is a schematic view of a color separation prism assembly of another embodiment of the invention.

FIG. 5 is a schematic view of a color separation prism assembly of another embodiment of the invention. As shown in FIG. 5, the incident light W entering the color separation prism assembly 40 is processed by a pre-stage polarization device 38 such that the light passing therethrough can be a combination of red component RS of S-polarized light, green component GP of P-polarized light, and blue component BP of P-polarized light. In this embodiment, the dichroic filters are eliminated from the bounding surface of the prism blocks 44 and 46 connected to the polarizing beam splitter 42 to achieve color separation and combination. As shown in FIG. 3, the red component RS of the S-polarized light is reflected by the PBS coating, and the green component GP and blue component BP of the P-polarized light penetrate the PBS coating. The light path is similar to the previous embodiment.

The invention is not limited to the disclosed embodiments or those skilled in the art disclosed, but is to be accorded the widest scope consistent with the principles and features disclosed herein. Note that separation sequence or determination of color polarization of different color components in each embodiment are disclosed as examples. Separation sequence of the color components are not in a specific order, and polarization is interchangeable according to different situations.

Furthermore, the prism block 46 comprises a rectangular prism. In an example, an angle β formed by one side of the rectangular prism and the bounding surfaces of the dichroic filter 28 is equal to 30°. The angle β, however, can be varied slightly while no more than 30°. Those skilled of the art, however, can increase the angle β to slightly greater than 30°, for example, 31°. The design can be achieved by increasing coating layers on a mirror side of the dichroic filter 28. The larger the angle β, the greater the number of coating layers, increasing manufacturing difficulties and costs.

Figure 6:
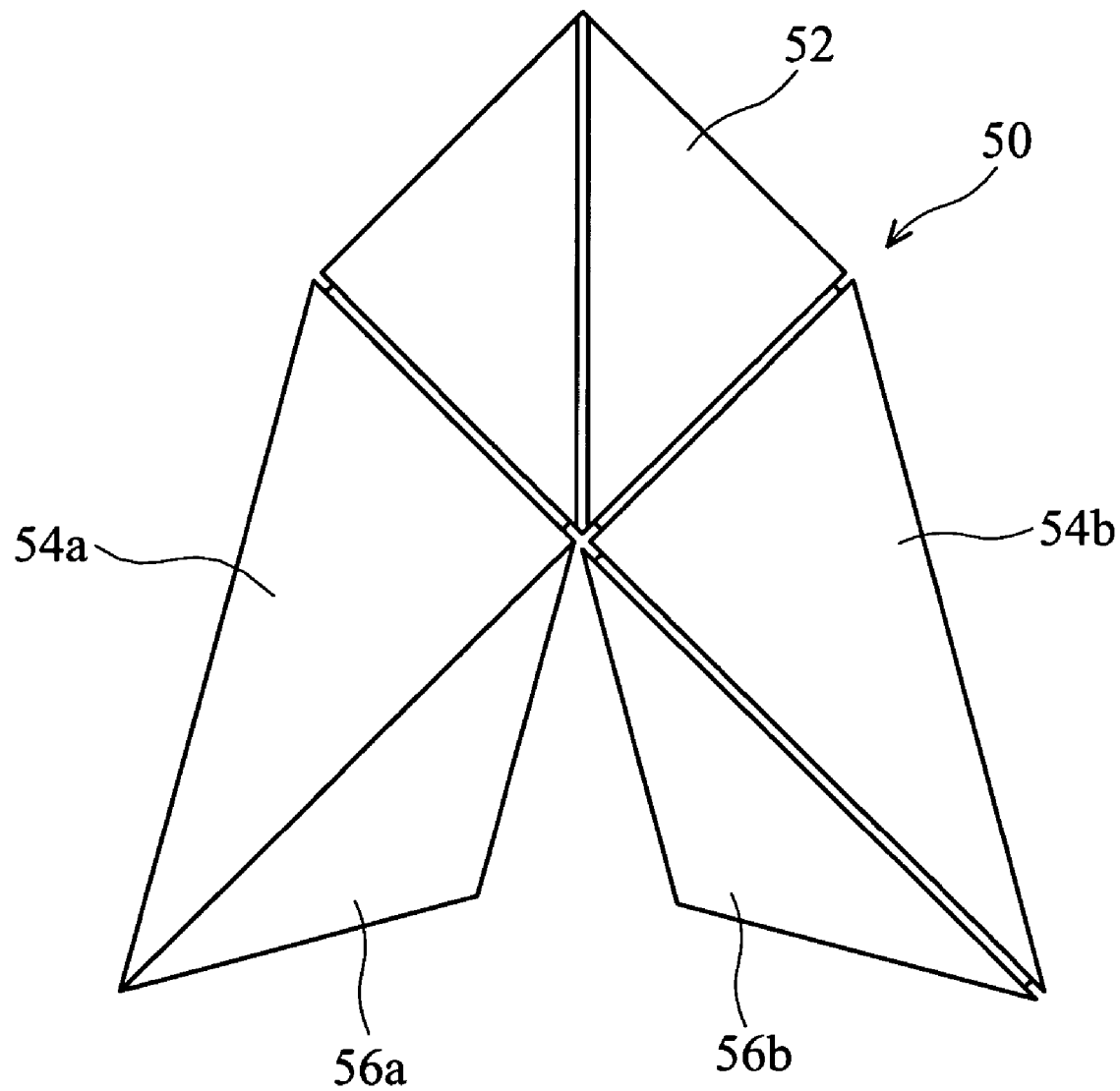
FIG. 6 is a schematic view of prism block arrangements of the color separation prism assembly of a variation of the invention.

In addition, the prism blocks can be combined with a heat-dissipating device in a variation of the color separation prism assembly of the invention. FIG. 6 is a schematic plan view of prism block arrangements of the color separation prism assembly of a variation of the invention. As shown in FIG. 6, the polarizing beam splitter 52 of the color separation prism assembly 50 has two bounding surfaces, connected to two identical rectangular prisms 54a and 54b, respectively. The rectangular prisms 54a and 54b, each has a base surface, connecting to two identical triangular prisms 56a and 56b, respectively. Two bounding surfaces of the triangular prisms 56a and 56b have the same length. That is, the prism block 14 of the first embodiment is identical to a combination of the prism block 16, a rectangular prism, and the prism block 18, a triangular prism. Thus, the manufacturing procedure is simplified and costs reduced accordingly.

Figure 7:
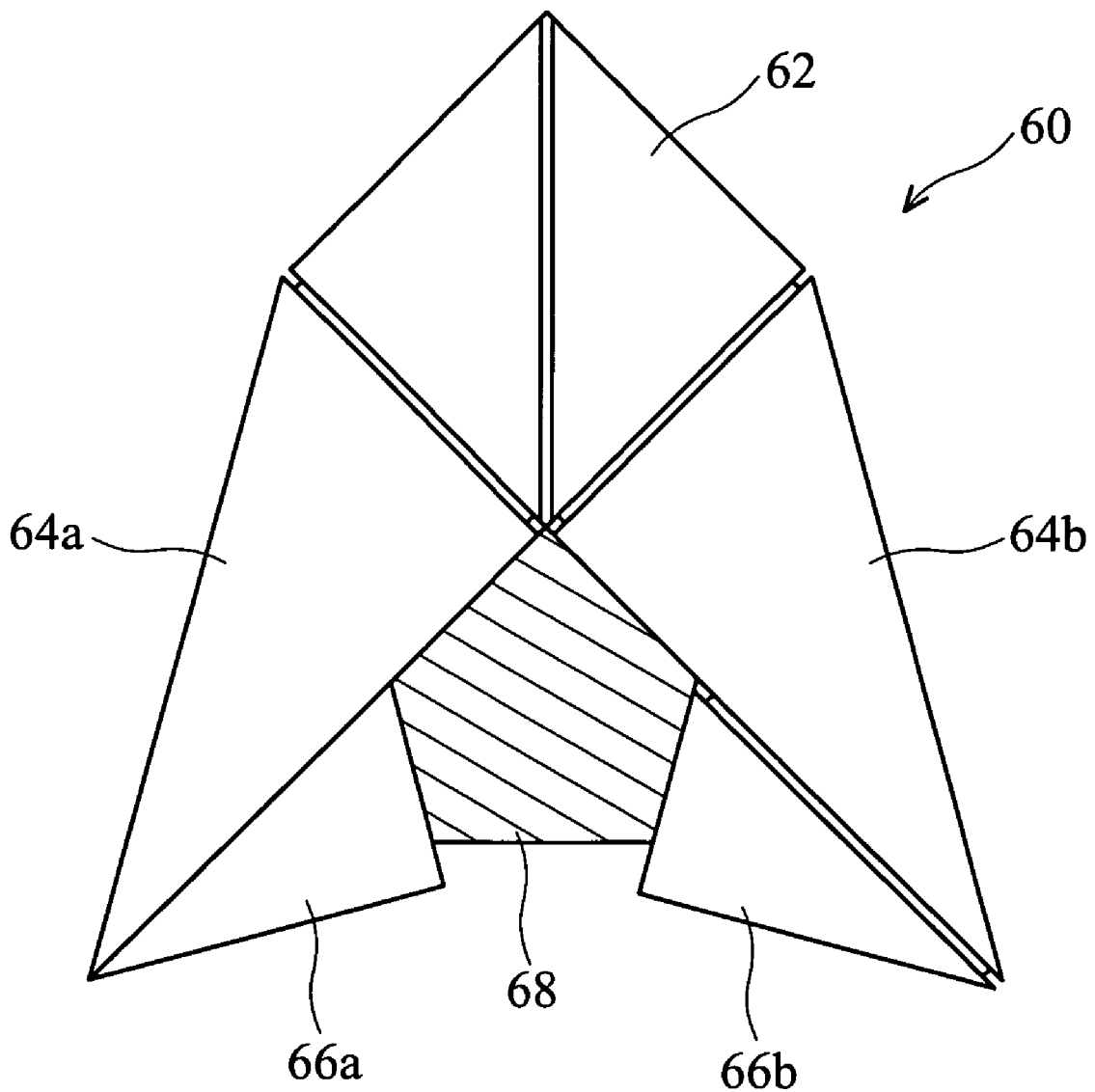
FIG. 7 is a schematic view of prism block arrangements of the color separation prism assembly of another variation of the invention.

FIG. 7 is a schematic plan view of prism block arrangements of the color separation prism assembly of another variation of the invention. As shown in FIG. 7, a polarizing beam splitter 62 of a color separation prism assembly 60 has two bounding surfaces, connected to two identical rectangular prisms 64a and 64b, respectively. Each base surface of the rectangular prisms 64a and 64b is connected to two identical rectangular prisms 66a and 66b. That is, the prism block 14 of the first embodiment is identical to a combination of the prism block 16 and prism block 18, which are rectangular prisms. Thus, the manufacturing procedure is simplified and costs reduced accordingly. Moreover, a heat-dissipating device 68 such as copper block or other metal conductor with high thermal conductivity can be disposed in a space surrounded by each prism block, and connected to the bounding surfaces of the surrounding prisms to absorb additional heat produced from the color separation prism assembly 60, thereby increasing lifetime of each coating layer.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A color separation prism assembly for a projector, comprising:
  a polarizing beam splitter, having a polarizing beam splitter coating on a plane thereof;
  a first prism block, coupled to a first bounding surface of the polarizing beam splitter;
  a second prism block, coupled to a second bounding surface of the polarizing beam splitter;

a third prism block, disposed between the first prism block and the second prism block; and a first filter, disposed between the third prism block and the second prism block.

2. The color separation prism assembly as claimed in claim 1, further comprising a second filter disposed between the first prism block and the first bounding surface, and a third filter disposed between the second prism block and the second bounding surface.

3. The color separation prism assembly as claimed in claim 2, wherein the first filter and the second filter are formed on the same plane.

4. The color separation prism assembly as claimed in claim 1, wherein a connecting surface between the first block and the third block is formed on the same plane as a diagonal plane of the polarizing beam splitter.

5. The color separation prism assembly as claimed in claim 2, wherein the first filter, the second filter, and the third filter are dichroic filters, respectively.

6. The color separation prism assembly as claimed in claim 1, wherein the polarizing beam splitter is substantially cube-shaped, and the polarizing beam splitter coating is formed by two parallel interfering films at a position diagonal to the cube.

7. The color separation prism assembly as claimed in claim 1, wherein an incident light enters the polarizing beam splitter coating at an incident angle of 45°.

8. The color separation prism assembly as claimed in claim 1, wherein the first prism block comprises a quadrangular prism.

9. The color separation prism assembly as claimed in claim 1, wherein the first prism block comprises a combination of a rectangular prism and a triangular prism.

10. The color separation prism assembly as claimed in claim 9, wherein the triangular prism has a right angle with two equal sides.

11. The color separation prism assembly as claimed in claim 1, further comprising a first liquid crystal light valve disposed parallel and facing the first prism block.

12. The color separation prism assembly as claimed in claim 1, further comprising a second liquid crystal light valve, disposed parallel and facing the second prism block.

13. The color separation prism assembly as claimed in claim 1, further comprising a third liquid crystal light valve, disposed parallel and facing the third prism block.

14. The color separation prism assembly as claimed in claim 12, wherein a bounding surface of the second liquid crystal light valve facing the second prism block and a bounding surface of the third prism block connected thereto form an angle no more than 30°.

15. The color separation prism assembly as claimed in claim 12, wherein the second prism block comprises a rectangular prism, and a bounding surface of the second liquid crystal light valve facing the second prism block is an inclined side of the rectangular prism.

16. The color separation prism assembly as claimed in claim 1, wherein the third prism block is a triangular prism.

17. The color separation prism assembly as claimed in claim 16, wherein the third prism block has a right angle with two equal sides.

18. The color separation prism assembly as claimed in claim 1, further comprising a heat-dissipation device, disposed in the color separation prism assembly and connected to the bounding surfaces of the prisms.

19. The color separation prism assembly as claimed in claim 1, wherein the first prism block and the second prism block are connected to the polarizing beam splitter by gluing.

20. The color separation prism assembly as claimed in claim 1, wherein the third prism block is connected to the first prism block and the second prism block by gluing.

21. The color separation prism assembly as claimed in claim 1, further comprising a pre-stage polarization device, polarizing a first color component of incident light into a first polarized light, and a second color component and a third color component into a second polarized light.

22. The color separation prism assembly as claimed in claim 21, wherein the first prism block, the second prism block, and the third prism block, each of which comprises a vertical light-penetrating surface, with respect to the first color component of the first polarized light, the third color component of the second polarized light, and the second color component of the second polarized light, respectively.

* * * * *